United States Patent [19]
Sparkman

[11] Patent Number: 5,555,878
[45] Date of Patent: Sep. 17, 1996

[54] SOLAR ENERGY COLLECTOR

[76] Inventor: Scott Sparkman, P.O. Box 240471, Honolulu, Hi. 26824-0471

[21] Appl. No.: 380,635

[22] Filed: Jan. 30, 1995

[51] Int. Cl.$^6$ ....................................................... F24J 2/10
[52] U.S. Cl. ........................................ 126/657; 126/652
[58] Field of Search .................................... 126/652–657

[56] References Cited

U.S. PATENT DOCUMENTS

| | | |
|---|---|---|
| 980,505 | 1/1911 | Emmet .................................... 126/657 |
| 1,989,999 | 6/1933 | Niederle . |
| 3,920,413 | 11/1975 | Lowery . |
| 4,038,965 | 8/1977 | Lyon . |
| 4,088,547 | 5/1978 | Albertson . |
| 4,096,850 | 6/1978 | Hadcroft . |
| 4,114,599 | 9/1978 | Stephens . |
| 4,151,828 | 5/1979 | Mather et al. . |
| 4,183,351 | 1/1980 | Hinotani et al. . |
| 4,184,478 | 1/1980 | Fuller . |
| 4,203,419 | 5/1980 | Ballinger . |
| 4,228,220 | 10/1980 | Garrison . |
| 4,273,104 | 6/1981 | Uroshevich . |
| 4,291,637 | 8/1981 | Wilson . |
| 4,307,712 | 12/1981 | Tracy . |
| 4,326,503 | 4/1982 | Geier et al. . |
| 4,331,494 | 5/1982 | Duchateau et al. . |
| 4,356,815 | 11/1982 | Spanoudis . |
| 4,368,725 | 1/1983 | McClintock . |
| 4,399,919 | 8/1983 | Posnansky et al. . |
| 4,505,263 | 3/1985 | Nameda et al. ........................ 126/652 |
| 4,579,107 | 4/1986 | Deakin . |
| 4,987,883 | 1/1991 | Watkins et al. . |

FOREIGN PATENT DOCUMENTS 57-155059  9/1982  Japan ..................... 126/653

*Primary Examiner*—Carroll B. Dority
*Attorney, Agent, or Firm*—Michael I. Kroll

[57] ABSTRACT

An improved solar energy collector comprising a heat absorber to take in radiant energy and transfer the radiant energy to a heat transfer fluid carried thereby. A transparent jacket is to receive the heat absorber therein. The jacket will allow the radiant energy to pass therethrough and reach the heat absorber. Components are for hermetically sealing the jacket and to form a chamber about the heat absorber. A facility is for allowing the heat transfer fluid to enter and exit from the heat absorber. A structure is for exhausting air out of the chamber, so as to produce a vacuum between the jacket and the heat absorber and to insulate the heat absorber from an external environment.

8 Claims, 3 Drawing Sheets

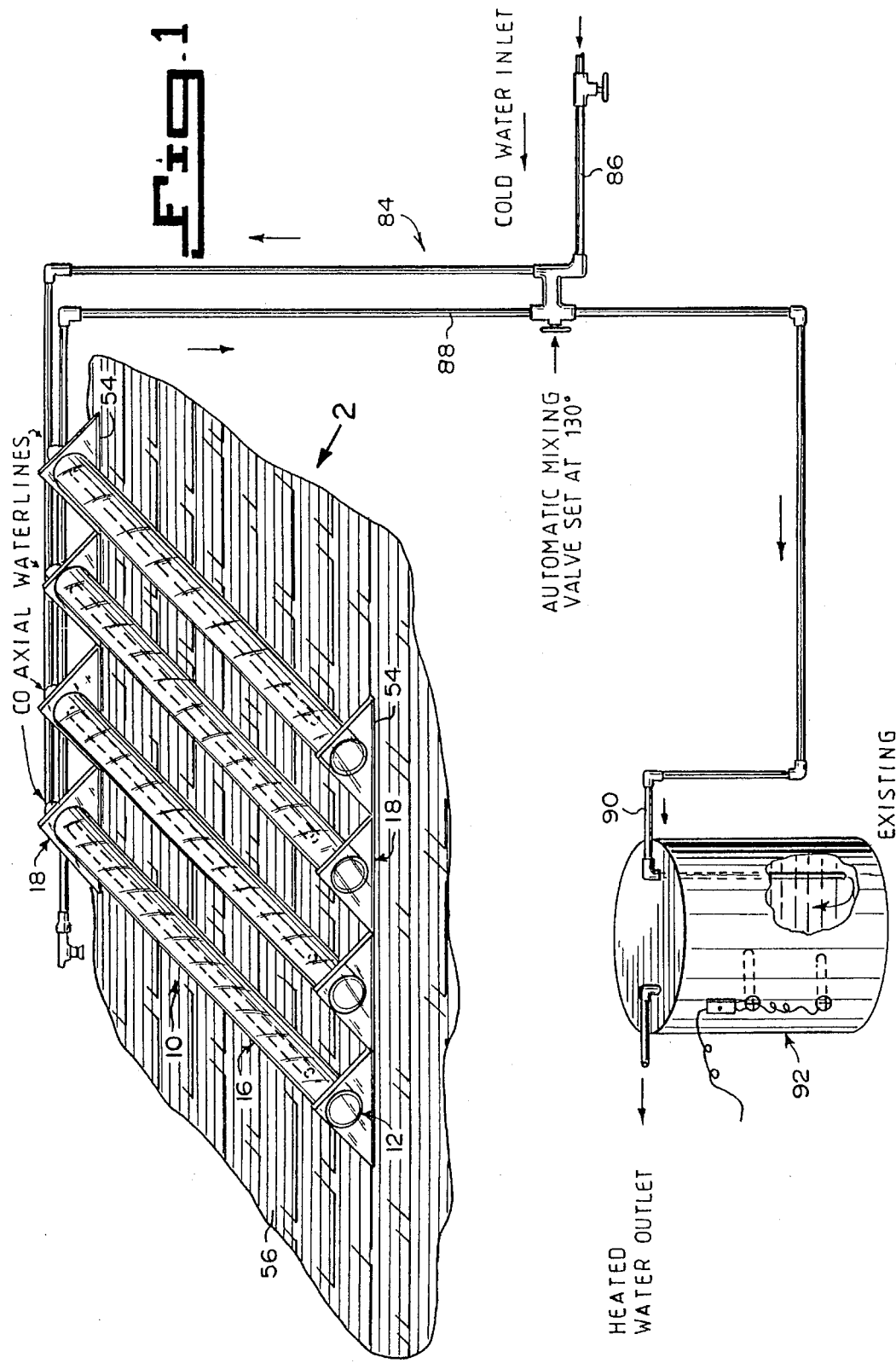

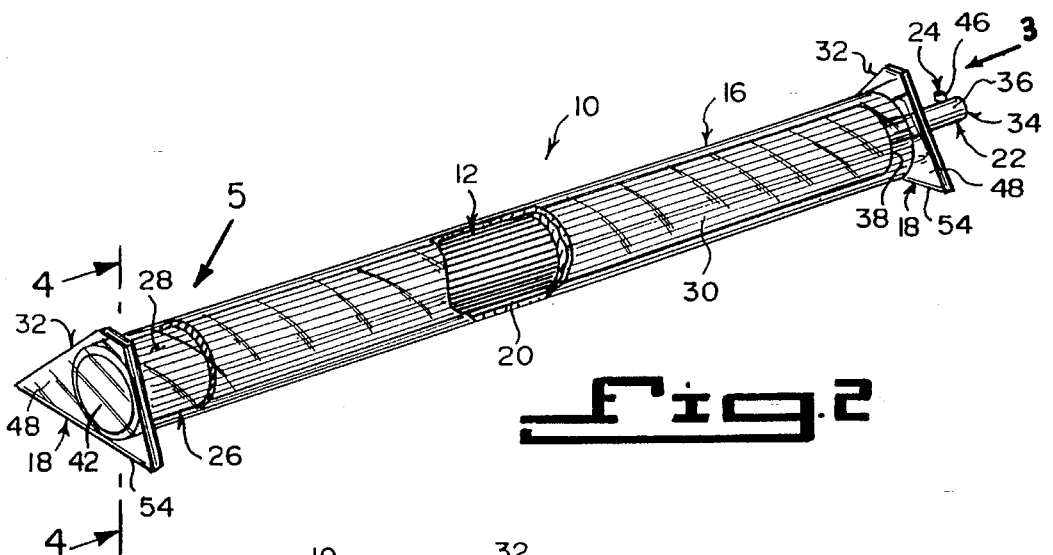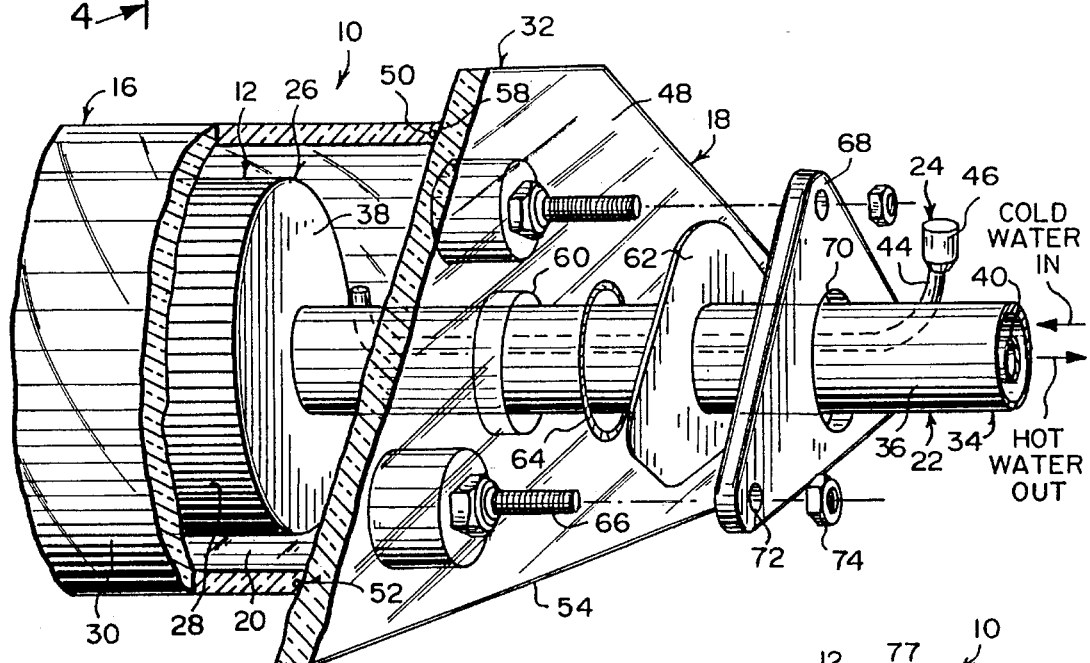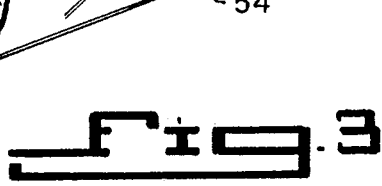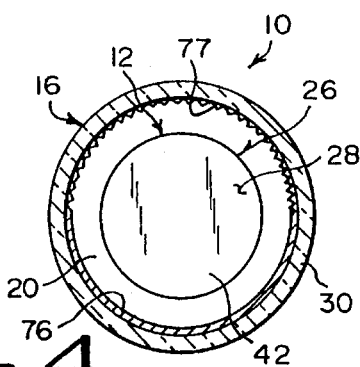

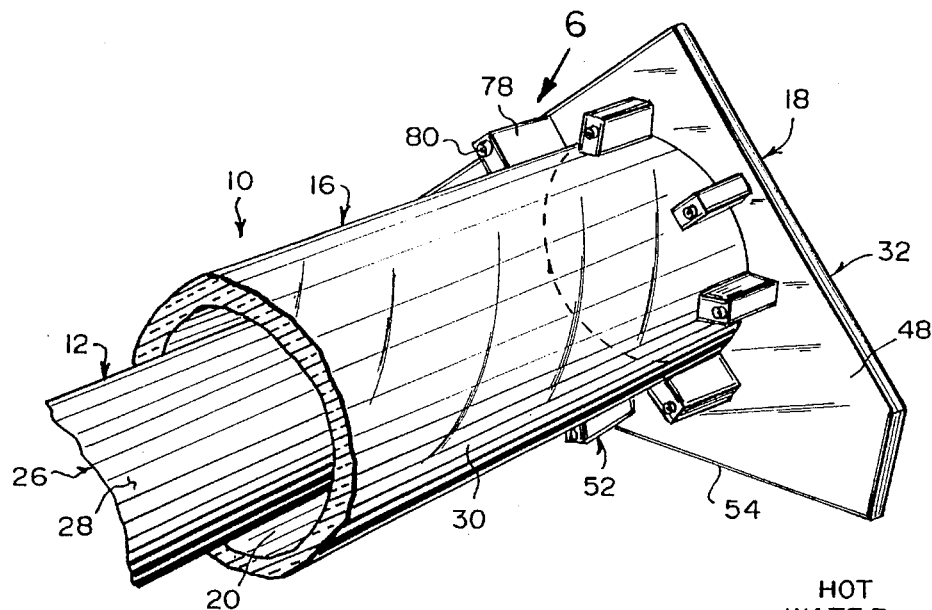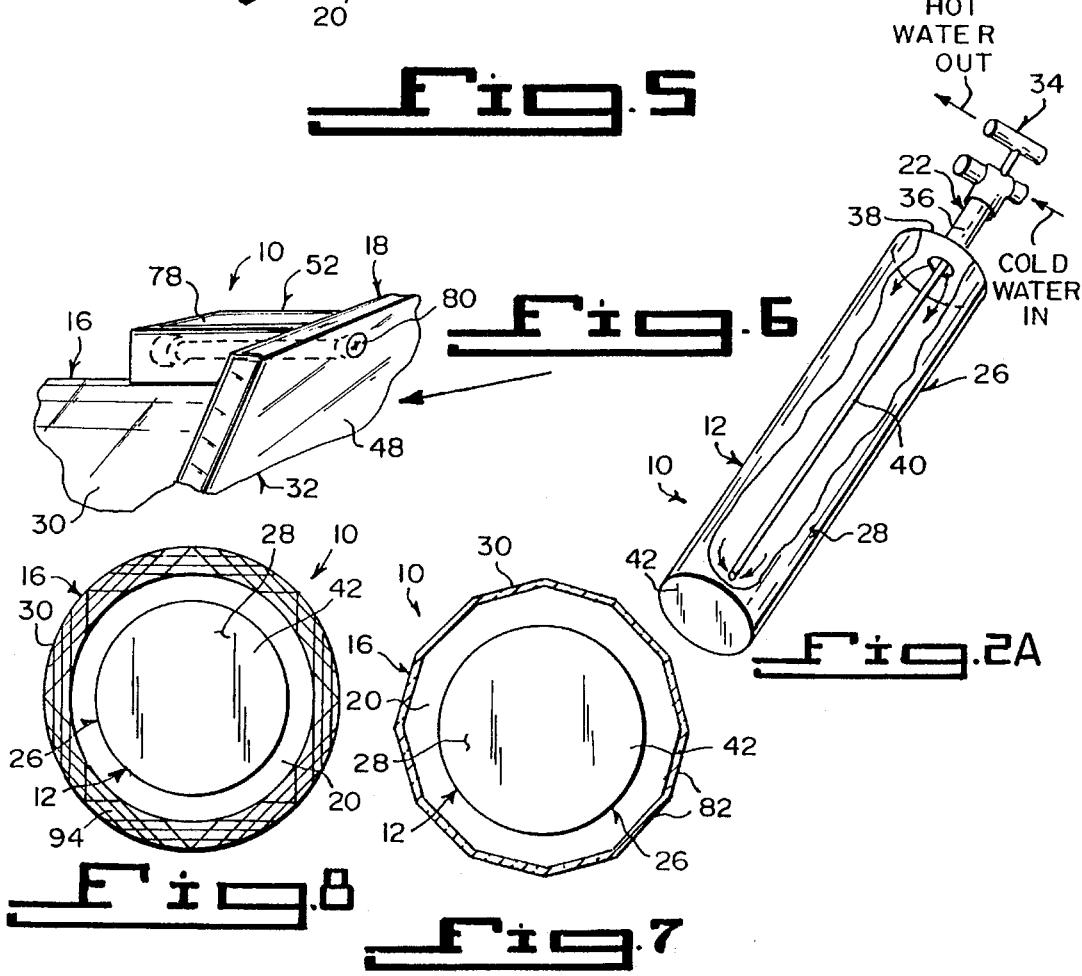

SOLAR ENERGY COLLECTOR

BACKGROUND OF THE INVENTION

The instant invention is the subject matter of Disclosure Document No.: 344672, filed in the PTO on Dec. 16, 1993, and Disclosure Document No.: 351625, filed in the PTO on Apr. 6, 1994. It is respectfully requested that these documents be retained beyond the two-year period so that they may be relied upon as evidence of conception of the invention during the prosecution phase of this application, should the need arise.

1. Field of the Invention

The instant invention relates generally to solar energy equipment and more specifically it relates to an improved solar energy collector.

2. Description of the Prior Art

Numerous solar energy equipment have been provided in prior art. For example, U.S. Pat. Nos. 1,989,999 to Niederle; 3,920,413 to Lowery; 4,038,965 to Lyon; 4,088,547 to Albertson; 4,096,850 to Hadcroft; 4,114,599 to Stephens; 4,151,828 to Mather et al.; 4,183,351 to Hinotani et al.; 4,184,478 to Fuller; 4,203,419 to Ballinger; 4,228,220 to Garrison; 4,273,104 to Uroshevich; 4,281,637 to Wilson; 4,307,712 to Tracy; 4,326,503 to Geier et al.; 4,331,494 to Duchateau et al.; 4,356,815 to Spandoudis; 4,368,725 to McClintock; 4,399,919 to Poshansky et al.; 4,473,447 to Gutwein et al.; 4,579,107 to Deakin, 4,911,145 to Ohashi and 4,987,883 to Watkins et al. all are illustrative of such prior art. While these units may be suitable for the particular purpose to which they address, they would not be as suitable for the purposes of the present invention as heretofore described.

NIEDERLE, MAX

SOLAR WATER HEATER

U.S. Pat. No. 1,989,999

A solar water heater comprising an elongated tubular glass cylinder having a portion thereof thickened convexly inwardly to form a longitudinally extending lens portion. An elongated water tube is disposed within the tubular member, to be subjected to solar rays concentrated and focused by the lens.

LOWERY, JAMES R.

PANEL FOR SELECTIVELY ABSORBING SOLAR THERMAL ENERGY AND THE METHOD OF PRODUCING SAID PANEL

U.S. Pat. No. 3,920,413

A panel for selectively absorbing solar thermal energy comprising a metallic substrate, a layer of bright metallic material carried on the substrate and a solar thermal energy absorbing coating carried on the bright metallic material. A layer of zinc is interposed between the metal substrate and the layer of bright material or the metallic substrate can be anodized for receiving the layer of bright metallic material. Also disclosed is the method for producing the coating, which selectively absorbs solar thermal energy.

LYON, FLOYD A.

EVACUATED SOLAR HEAT COLLECTOR

U.S. Pat. No. 4,038,965

In a solar heat collector, a shallow hollow member, a transparent cover for the member, and plurality of load bearing partitions in the hollow member. A plurality of heating collecting plates are spaced between the partitions. A plurality of water pipes are each connected along one of the collector plates and the water pipe are connected in parallel. Inlet and outlet water pipes are connected to the parallel connected pipes. The outlet pipe connection has an expansion loop to compensate for temperature variations. Vacuum is applied to the hollow member. The partitions are proportioned and spaced, so as to support the cover against external atmospheric pressure. Conduction and convection losses from the heat collector plates are minimized because of the vacuum.

ALBERTSON, CLARENCE E.

METHOD FOR PRODUCING A COATED METAL NODULAR SOLAR HEAT COLLECTOR

U.S. Pat. No. 4,088,547

A solar heat collector comprising a metallic substrate having nodular or dendritic surfaces coated with a black absorber coating and the method of preparing the same.

HADCROFT, JOHN MACKAY

HEAT ABSORBER FOR A SOLAR HEATING SYSTEM

U.S. Pat. No. 4,096,850

In one aspect, the present invention consists in a heat absorber for a solar heating system. The absorber includes a support member, a flexible heating bag having inlet and outlet connections and arranged to be supported in use by the support member and a retaining member positioned in use on the opposite side of the bag from the support member, so as to control the depth of the heating bag therebetween. When the heating bag is filled with fluid, the retaining member is adapted to allow at least a substantial portion of the face of the heating bag adjacent thereto, to be exposed to sunlight in use.

STEPHENS, JAMES W.

SOLAR COLLECTOR

U.S. Pat. No. 4,114,599

A light weight, low cost, non-corroding, high efficiency solar energy collector is comprised of an absorber plate, which is adapted to absorb solar energy in the form of heat and to transfer by conductance the heat to a heat exchange medium. The absorber plate has disposed therein a highly heat conductive filler, which imparts increase thermal conductivity to the plastic material of the absorber plate. An energy absorbing pigment, or a sheet of transparent plastic material is employed, which transmits solar energy to a heat exchange medium which has dissolved therein a dye or pigment of a solar energy absorbing color. For greater thermal conductivity, the sheet of transparent plastic material may have disposed therein a thin sheet of metal, which absorbs and conducts heat to a heat exchange medium.

MATHER, PHILLIP E.

SHERLOCK, SCOTT T.

SOLAR ENERGY COLLECTION TUBE

U.S. Pat. No. 4,151,828

A cylindrical metal tube is provided with an outer transparent jacket, the jacket being spaced apart from the tube by bushings at each end and sealed therewith by means of o-ring type elastomeric seals positioned in grooves in the bushings. The intermediate space between the tube and jacket is evacuated through a side tube on the jacket, to reduce heat loss from the surface of the tube due to convection of air. The solar energy collector tube of this invention is applicable to flat plate type collector installations, as well as concentrating collectors, such as those employing parabolic trough reflectors. The flow path of the heat transfer fluid is straight through the tube, affording simple manifolding of multiple solar energy collection tubes arranged in parallel to span a specified area of collection.

HINOTANI, KATSUHIRO

KANATANI, KEIICHI

OSUMI, MASATO

HAYAMA, HAJIME

SOLAR HEAT COLLECTING APPARATUS

U.S. Pat. No. 4,183,351

A solar heat collecting apparatus, which may realize improvements in workability in the manufacturing process. Easier handling in transportation and installation and lower manufacturing and handling costs, which comprises an outer tube of transparent glass and heat collecting tube disposed therein. The inside is formed as a passage for a heating medium and metallic end plates for hermetically closing the space between the heat collecting tube and each of the end open portions of the outer tube. One of the end plates is provided with an exhaust tubulure.

FULLER, DEAN I.

HEAT EXCHANGERS AND SOLAR HEATING

U.S. Pat. No. 4,184,478

The invention particularly relates to a heat exchanger and a solar heating unit incorporating the heat exchanger. The heat exchanger is constructed with an outer tubular member closed at its ends and provided with a fluid inlet at one end and a fluid outlet at the other end. An inner tubular member of different cross-sectional shape to the cross-sectional shape of the outer tubular member is positioned and dimensioned, so as to provide a plurality of longitudinal points of contact between the outer member inner surface the inner member outer surface. A plurality of fluid ducts defined by the longitudinal wall portions of the outer and inner tubular members are between the points of contact.

BALLINGER, DALE O.

SOLAR CELL

U.S. Pat. No. 4,203,419

A solar cell has a heat collector bar with a heat absorbing material in contact therewith. The heat absorbing material includes a transparent web member having a plurality of capsules uniformly distributed therein. Each capsule has a suspension of highly reflective, flake-like, field responsive particles therein. The particles may be preoriented with respect to incident electromagnetic radiation.

GARRISON, JOHN D.

SELECTIVE ABSORBER ON GLASS AND METHOD FOR ITS PRODUCTION

U.S. Pat. No. 4,228,220

An improved selective absorber on a glass substrate having high solar absorption and lower infrared emission. The selective absorber on a glass substrate includes an electrically conducting layer of silver metal having a thickness on the order of 0.1 microns and an absorbing layer of either black nickel or, alternatively, a layer of oxidized iron over a layer of nickel or bright nickel. The method of this invention defines the process of producing a selective absorber on a glass substrate by thoroughly cleaning the glass, chemically depositing a thin layer of silver metal over the clean glass surface, then electroplating an absorbing layer over the silver layer. The absorbing layer may be electroplated black nickel or, alternatively, an electroplated layer of nickel or bright nickel, such as cobalt-nickel and an electroplated cover layer of iron. The glass substate and composite layers are heat treated to be thermally cured,, to improve its optical and properties.

UROSHEVICH, MIROSLAV

SOLAR ENERGY COLLECTORS

U.S. Pat. No. 4,273,104

The disclosure illustrates a focusing solar energy collector, that has a main reflector made up of a central support rib and a plurality of lateral support ribs extending from the main support to form a series of cross shaped supports, for a thin reflective sheet held on the supports by a double faced tape. The central support rib connects with end supports for an evacuated cylindrical glass tube, that contains a receiver and a secondary mirror. The secondary mirror is formed from an extrusion and comprises an elongated curved reflective surface having its edges touching the glass cylinder, and an elongated rib also touching the glass, to give three point support. A flexible seal is provided between the receiver and the end plates, for the glass cylinder to accommodate differential expansion.

WILSON, PRYCE

CONCENTRATING VACUUM ISOLATED SOLAR ENERGY COLLECTION APPARATUS EMPLOYING REFLECTOR

U.S. Pat. No. 4,281,637

A concentrating vacuum isolated solar energy collecting and converting apparatus employing transfer means for selectively moving the collected energy back through the vacuum preservation means, for useful purposes and employing a fluid conducting cover and a selectively positionable reflective shield.

TRACY, RICHARD B.

ROTATABLE, HERMETICALLY SEALED, TUBULAR, SOLAR HEAT COLLECTING SYSTEM

U.S. Pat. No. 4,307,712

A system comprising one or more straight, rotatable, hermetically sealed, tubular solar heat collecting units, employs for each unit an outer tube and concentric with it an inner tube, the two tubes double-housing an axial multi-flanged or finned tubular conductor of fluid to be heated. To heat fluid, a reflective sheet is disposed to take the curve of the reflective trough and concentrate radiant energy from the sun onto the conduit, when stray reflections may be caught by the flanges, relieving requirement for good optical figure in the reflective sheet. End caps seal the unit except for the protrusive ends of the conductor. The conductor can act as axis of rotation for each unit. In an array, a plurality of the units can be interconnected and driven in unison to follow the sun.

GEIER, LEONARD W.

DUNN, KENNETH F.

TURBULENT SOLAR COLLECTOR

U.S. Pat. No. 4,326,503

A solar collector of the tubular type, comprising a solar energy transmissive outer tube encircling a solar energy converter inner tube disposed for having a flow of fluid directed longitudinally through it. The outer and inner tubes have respective opposing end portions sealed to one another and respective mid-portions radially spaced from one another, for forming an interposed vacuum chamber. The sealed joints may include at least one flexible member, disposed to compensate for differences in thermal characteristics of the inner and outer tubes. The inner tube is provided with an exhaust tubulation, which communicates with the vacuum chamber for evacuating the chamber and extends inwardly of the inner tube, for producing turbulence in the flow of fluid to aid in the transfer of heat energy from the inner tube to the fluid.

DUCHATEAU, JACQUES

NICOLAS, MAURICE

SOLAR PANEL AND METHOD OF MANUFACTURING A SOLAR PANEL

U.S. Pat. No. 4,331,494

A solar panel comprising at least one solar energy transducer laminated between a transparent vitreous sheet and a second sheet, in which the transducer is imbedded in a layer of transparent polymeric material which bonds the sheets together. The polymeric material comprises an acrylic compound. A method of making the aforesaid solar panel in which the acrylic compound is allowed to set in situ is described.

SPANOUDIS, LOUIS

SOLAR ENERGY COLLECTOR HAVING AN ABSORBER ELEMENT OF COATED FOIL

U.S. Pat. No. 4,356,815

A solar energy collector and process for its preparation are disclosed. The collector comprises spaced apart wall members, in which one wall member is adapted to face solar radiation and the other wall member is spaced on the remote side of the first wall member and adapted to contact a heat-absorbing medium. A foil, disposed between the wall members, has coatings on its opposite sides. The side of the foil facing the wall member receiving solar radiation has a solar selective coating and the other side of the foil facing the other wall member has an emissive coating, providing relatively high emissivity in the infrared spectrum. Preferably, the foil is metallic and pre-coated prior to assembling with other parts of the solar collector.

McCLINTOCK, MICHAEL

SOLAR ENERGY COLLECTOR

U.S. Pat. No. 4,368,725

A solar window which can alternatively act either as a passive solar heat collector or an active solar heat collector. A substantially transparent pair of panels are mounted in opposed position to each other and define a chamber therebetween. When it is desired to admit solar energy to the structure in which the window is mounted, air is permitted to be retained in the chamber and sunlight to pass through the window to thus heat the interior of the structure. When heat is not required in the structure, a second fluid which may be an optically dense solar energy absorbent or reflective fluid is passed through the chamber, so as to respectively absorb or reflect the sunlight passing into the chamber and in this way reduce the amount of solar heat passing through the window and in the case of an absorbent fluid, to retain the heat for later use. Pleasing architectural aesthetics or practical advantages in the case of greenhouses may further be obtained by passing colored fluid through the chamber, which fluid may additionally achieve the selective absorption of light of certain wavelengths passing through the window. An alternative embodiment of the invention includes providing the inside window panel with grooves adjacent the chamber and disposed at such an angle thereto, that radiation in a spectral region in which the material of the window is at least partially transparent, attempting to pass outwardly through the window is substantially reflected back into the structure. Accordingly, the angle at which the walls of such grooves are disposed must exceed the critical angle, to support total internal reflection for the particular materials utilized.

POSNANSKY, MARIO

UTIGER, URS

VACUUM FLASK

U.S. Pat. No. 4,399,919

In a flask comprising a closed vessel with double walls enclosing a vacuum, layers of substances capable of absorbing light rays and/or of selectively acting upon light rays are applied, to enable more radiant energy to reach the space enclosed by the inner wall than that spaced can radiate to the outside. Thus, an increasing amount of heat is supplied to the spaced enclosed by the inner wall and cold matter introduced into that space is heated. The effect of the light rays can be increase by designing part of a protective jacket of the flask, so that it is capable of being swung open and of acting as a reflector in that position.

GUTWEIN, HERBERT

ERBEN, EDWIN

MUHLRATZER, AUGUST

CORNILS, BOY

TIHANYI, BELA

DEWIN, WERNER

METHOD OF MANUFACTURING ABSORPTION LAYERS FOR SOLAR ENERGY SYSTEMS AND BATH THEREFOR

U.S. Pat. No. 4,473,447

Method for manufacturing solar absorption layers by electrodeposition of heavy metals, such as Ni and Co, from aqueous citrate solutions. The heavy metal citrates are produced by direct reaction of metal oxides or carbonates with citric acid. The electrolyte concentration is a maximum 5% and has a pH of between 8 and 11. The deposition process takes place at room temperature, bath voltages of 8 to 30 V, and current densities of 3 to 10 A/dm2. The layers produced by this method are well bonded black layers resistant to temperatures up to 700 degrees C.

DEAKIN, DAVID

SOLAR ENERGY COLLECTOR AND METHOD OF MAKING SAME

U.S. Pat. No. 4,579,107

Method and device manufactured thereby for economically making solar collectors and concentrators by employing a technique of applying high-efficiency, energy absorptive coatings. The technique is spraying less-than-ultra-pure nickel or chromium, in a molten state, onto a heated surface of a glass absorber substrate so that a thin metallic layer fuses thereon. After spraying, the metallic layer is chemically blackened. An outer glass insulator jacket is hermetically sealed, using a glass-to-glass junction, over the inner glass absorber substrate to provide an insulating space. The spraying technique employed is more economical than by applying the metallic coating by conventional vapor deposition and sputtering techniques, which require expensive equipment and ultra-pure metals. Absorption efficiency exceeding 95% with infrared emissions below 0.09% has been achieved. Borosilicate glass is preferred, but other transparent substances can also be used. The technique is employed with both tubular and flat plate type solar collectors and/or concentrators. A better design and a self circulation heat-exchange fluid system also are disclosed.

OHASHI, KIYOSHI

VACUUM TYPE SOLAR HEAT COLLECTING APPARATUS

U.S. Pat. No. 4,911,145

A vacuum type solar heat collecting apparatus comprising a transparent, elongated cylindrical glass container sealed at one end and opening at the other end which is reduced in diameter. A cylindrical metal water-reservoir sealed at one end and open at the other end, reduced in diameter and coaxially disposed in the glass container through supporters. The outer surface of the water-reservoir is coated with a selective absorption film. A first elongate, pipe extends to the vicinity of the sealed end in the water-reservoir through the open ends of the glass container and water-reservoir. A second short pipe extends through the open end of the container for connection to the open end of the reservoir. A sealing metal fixture seals the opening part of the small diameter of the glass container. Space between the glass container and the water-reservoir is kept in a vacuum. Water is fed into the water-reservoir through either of the first pipe and second pipe, and is stored to collect heat in the water-reservoir, taken out as hot water.

WATKINS, ALBERT W.

WATKINS, IVAN W.

EVACUATED SOLAR COLLECTOR TUBE

U.S. Pat. No. 4,987,883

The present invention has two tubes arranged concentrically and separated by a vacuum. The internal tube is of thin wall steel construction with a selective absorbing coating. The external tube is a hard glass material such as, for example, Pyrex. The vacuum tight seal between the concentric tubes consists of an accordian-pleated semi-rigid material such as copper connected to the inner tube. The semi-rigid material is then fused to a thermally insulating, vacuum tight spacer. Finally, the spaced is fused to the outer glass tube. Additional shatter protection may be derived from a reflective coating extending from midway along the ceramic spacer over the ceramic-glass seal and along the glass for several inches.

SUMMARY OF THE INVENTION

A primary object of the present invention is to provide an improved solar energy collector that will overcome the shortcomings of the prior art devices.

Another object is to provide an improved solar energy collector that is constructed out of a plastic such as Kevlar or acrylic blends, having specific advantages such as ultra violet inhabitation, high temperature functionality, heat retainment, increased thermal expansion coefficients, elasticity, ease of assembly (acrylic glues), breakage protection, increased vacuum capability and better sealing properties.

An additional object is to provide an improved solar energy collector, in which each end plate contains a flat support base,, so that each individual collector can be mounted in a stationary position Onto a roof, without slipping or rolling on the roof.

A further object is to provide an improved solar energy collector that is simple and easy to use.

A still further object is to provide an improved solar energy collector that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 1 is a diagrammatic perspective view, showing the instant invention in multiple units on a roof applied in a parallel hookup into a solar heating system.

FIG. 2 is a perspective view taken in the direction of arrow 2 in FIG. 1, with parts broken away of the instant invention per se.

FIG. 2A is a diagrammatic perspective view with parts broken away, showing a cold and hot water manifold connection to the storage tank.

FIG. 3 is an enlarged partly exploded perspective view as indicated by arrow 3 in FIG. 2, showing the sealing structure at one end plate.

FIG. 4 is a cross sectional view taken along line 4—4 in FIG. 2, showing the serrated prism surface and reflective foil paper liner within the tubular body.

FIG. 5 is a perspective view with parts broken away taken in the direction of arrow 5 in FIG. 2, showing another way of connecting the end plate to the tubular body.

FIG. 6 is an enlarged perspective view with parts broken away taken in the direction of arrow 6 in FIG. 5, showing one of the cleats in greater detail.

FIG. 7 is a cross sectional view similar to FIG. 4, showing the tubular body having a plurality of longitudinal flat segments thereabout.

FIG. 8 is a diagrammatic cross sectional view similar to FIGS. 4 and 7, showing the tubular body having a plurality of honeycomb voids.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1 through 7 illustrate an improved solar energy collector 10, comprising a heat absorber 12 to take in radiant energy and transfer the radiant energy to a heat transfer fluid 14, such as water, carried thereby. A transparent jacket 16 is to receive the heat absorber 12 therein. The jacket 16 will allow the radiant energy to pass therethrough and reach the heat absorber 12. Components 18 are for hermetically sealing the jacket 16 and to form a chamber 20 about the heat absorber 12. A facility 22 is for allowing the heat transfer fluid 14 to enter and exit from the heat absorber 12. A structure 24 is for exhausting air out of the chamber 20, so as to produce a vacuum between the jacket 16 and the heat absorber 12 and to insulate the heat absorber 12 from an external environment. The heat absorber 12 includes an elongated cylindrical storage tank 26. A black nickel or selective coating 28 is placed upon an outer surface of the storage tank 26.

The transparent jacket 16 is an elongated clear plastic tubular body 30, having an internal diameter larger than an external diameter of the storage tank 26. When the storage tank 26 is concentrically positioned within the tubular body 30, the chamber 20 will longitudinally extend therebetween. The hermetically sealing components 18 are a pair of end capping assemblies 32, each of which is affixed to one end of the tubular body 30.

The heat transfer fluid enter and exit allowing facility 22 is a coaxial main port manifold 34, which extends through one end capping assembly 32. The manifold has an outer pipe 36, fluidly connected to a first end 38 of the storage tank 26. An inner narrow pipe 40 extends through the outer pipe 36 and internally within the storage tank 26, to approximate a second end 42 of the storage tank 26. The heat transfer fluid 14 can enter the outer pipe 36 cold and then exit the inner narrow pipe 40 hot.

The air exhausting structure 24 includes a vacuum tube 44, which extends through one end capping assembly 32 and into the chamber 20. A valve outlet 46 is on a distal end of the vacuum tube 44 in the external environment. A vacuum pump (not shown) can be attached to the valve outlet 46 and withdraw the air from the chamber 20, to create the vacuum therein.

Each end capping assembly 32, as best seen in FIG. 3, consists of an end plate 48. An annular indium wire seal 50 is provided. Paraphernalia 52 is for attaching the end plate 48 transversely to an end of the tubular body 30, with the annular indium wire seal 50 therebetween. Each end plate 48 includes a flat support base 54. The collector 10 can be mounted in a stationary position onto a roof 56, without slipping or falling on the roof 56, as shown in FIG. 1. The attaching paraphernalia 52 is glue 58.

The end capping assembly 32 with the coaxial main port manifold 34 includes the end plate 48 having a central aperture 60 therethrough, to allow the coaxial main port manifold 34 to pass therethrough. A metal sheet 62 is affixed to the outer pipe 36 of the manifold 34. An O-ring gasket or indium wire 64 is on the outer pipe 36 between the metal sheet 62 and the end plate 48. A plurality of flange bolts 66 are radially molded into the end plate 48. A compression flange 68 is provided, having a central opening 70 therethrough and a plurality Of holes 72 thereabout. The compression flange 68 can slide upon the outer pipe 36 with the flange bolts 66 extending through holes 72. A plurality of nuts 74 thread onto the flange bolts 66, so that when tightened, the compression flange 68 will press against the metal sheet 62, thus creating an airtight seal with the O-ring gasket or indium wire 64.

As shown in FIG. 4, a reflective foil paper liner 76 is placed longitudinally on an inner lower surface of the tubular body 30. A serrated prism 78 is formed longitudinally on an inner upper surface of the tubular body 30, to help deflect back escaping radiant energy to the storage tank 26.

The attaching paraphernalia 52 in FIGS. 5 and 6, can also be a plurality of cleats 78, radially affixed about the end of the tubular body 30. A plurality of bolts 80 are provided. Each bolt 80 is threaded longitudinally through one cleat 78 and into the end plate 48. FIG. 7 shows the tubular body 30 with a plurality of longitudinal flat segments 82 thereabout, to help deflect back escaping radiant energy to the storage tank 26, as well as increasing lateral strength to the tubular body 30.

FIG. 1 shows a plurality of improved solar energy collectors 10 in a parallel arrangement in a solar heating system 84 on the roof 56. A cold water inlet pipe 86 is attached to each of the outer pipes 36. A hot water outlet pipe 88 is connected between the inner narrow pipes 40 and an inlet pipe 90 of an existing water heater 92 within a building.

In FIG. 8, the tubular body 30 has a plurality of honeycomb voids 94 that are filled with a pressurized insulating fluid via a connecting channel (not shown) in one end plate 48. The honeycomb voids 94 help deflect back escaping radiant energy to the storage tank 26, as well as increasing lateral strength to the tubular body 30. The pressurized insulating fluid can be Kryton gas. Any loss of pressure would indicate a leak into the chamber 20. The pressure can be measured with a typical tire gauge at a valve (not shown) on the tubular body 30.

LIST OF REFERENCE NUMBERS

- 10 improved solar energy collector
- 12 heat absorber
- 14 heat transfer fluid
- 16 transparent jacket
- 18 hermetically sealing component
- 20 chamber between 12 and 16
- 22 heat transfer fluid enter and exit allowing facility
- 24 air exhausting structure
- 26 elongated cylindrical storage tank for 12
- 28 black nickel or selective coating on 26
- 30 elongated clear plastic tubular body for 16
- 32 end capping assembly for 18
- 34 coaxial main port manifold for 22
- 36 outer pipe of 34
- 38 first end of 26
- 40 inner narrow pipe of 34
- 42 second end of 26
- 44 vacuum tube of 24
- 46 valve outlet on 44
- 48 end plate of 32
- 50 annular indium wire seal of 32
- 52 attaching paraphernalia
- 54 flat support base of 48
- 56 roof
- 58 glue for 52
- 60 central aperture in 32
- 62 metal sheet on 36
- 64 O-ring gasket or indium wire
- 66 flange bolt on 48
- 68 compression flange
- 70 central opening in 68
- 72 hole in 68
- 74 nut
- 76 reflective foil paper liner
- 78 cleat of 52
- 80 bolt of 52
- 82 longitudinal flat segment of 30
- 84 solar heating system
- 86 cold water inlet pipe to 36
- 88 hot water outlet pipe to 40
- 90 inlet pipe of 92
- 92 existing water heater
- 94 honeycomb void in 30

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved solar energy collector comprising:

a) a heat absorber to take in radiant energy and transfer the radiant energy to a heat transfer fluid carried thereby, said heat absorber including an elongated cylindrical storage tank, and a black nickel/selective coating placed upon an outer surface of said storage tank;

b) a transparent jacket to receive said heat absorber therein, whereby said jacket will allow the radiant energy to pass therethrough and reach said heat absorber, said transparent jacket being an elongated clear plastic tubular body having an internal diameter larger than an external diameter of said storage tank, so that when said storage tank is concentrically positioned within said tubular body, the chamber will longitudinally extend therebetween;

c) means for hermetically sealing said jacket and to form a chamber about said heat absorber, said hermetically sealing means including a pair of end capping assemblies, each of which is affixed to one end of said tubular body;

d) means for allowing the heat transfer fluid to enter and exit from said heat absorber, said heat transfer fluid enter and exit allowing means being a coaxial main port manifold which extends through one said end capping assembly, said manifold having an outer pipe fluidly connected to a first end of said storage tank and an inner narrow pipe extending through said outer pipe internally within said storage tank to approximate a second end of said storage tank, so that the heat transfer fluid can enter said outer pipe cold and then exit the inner narrow pipe hot; and e) means for exhausting air out of the chamber, so as to produce a vacuum between said jacket and said heat absorber and to insulate said heat absorber from an external environment, said air exhausting means including a vacuum tube which extends through one said end capping assembly and into the chamber, and a valve outlet on a distal end of said vacuum tube in the external environment, so that a vacuum pump can be attached to said value outlet and withdraw the air from the chamber to create the vacuum therein, each said end capping assembly including an end plate, an annular indium wire seal, and means for attaching said end plate transversely to an end of said tubular body with said annular indium wire seal therebetween.

2. An improved solar energy collector as recited in claim 1, wherein each said end plate includes a flat support base, so that said collector can be mounted in a stationary position onto a roof without slipping or rolling on the roof.

3. An improved solar energy collector as recited in claim 2, wherein said attaching means is glue.

4. An improved solar energy collector as recited in claim 3, wherein said end capping assembly with said coaxial main port manifold includes:

a) said end plate having a central aperture therethrough, to allow said coaxial main port manifold to pass therethrough;

b) a metal sheet affixed to said outer pipe of said manifold;

c) an O-ring gasket/indium wire on said outer pipe between said metal sheet and said end plate;

d) a plurality of flange bolts radially molded into said end plate;

e) a compression flange having a central opening therethrough and a plurality of openings thereabout, so that said compression flange can slide upon said outer pipe with said flange bolts extending through said openings; and f) a plurality of nuts to thread onto said flange bolts, so that when tightened, said compression flange will press against said metal sheet, thus creating an airtight seal with said O-ring gasket/indium wire.

5. An improved solar energy collector as recited in claim 4, further including:

a) a reflective foil paper liner placed longitudinally on an inner lower surface of said tubular body; and b) a serrated prism formed longitudinally on an inner upper surface of said tubular body to help deflect back escaping radiant energy to said storage tank.

6. An improved solar energy collector as recited in claim 2, wherein said attaching means includes:

a) a plurality of cleats radially affixed about the end of said tubular body; and b) a plurality of bolts, whereby each said bolt is threaded longitudinally through one said cleat and into said end plate.

7. An improved solar energy collector as recited in claim 2, wherein said tubular body includes a plurality of longitudinal flat segments thereabout to help deflect back escaping radiant energy to said storage tank, as well as increasing lateral strength to said tubular body.

8. An improved solar energy collector as recited in claim 2, wherein said tubular body has a plurality of honeycomb voids that are filled with a pressurized insulating fluid via a connecting channel in one said end plate, to help deflect back escaping radiant energy to said storage tank, as well as increasing lateral strength to said tubular body.

* * * * *